(12) United States Patent
Worden et al.

(10) Patent No.: US 11,237,081 B2
(45) Date of Patent: *Feb. 1, 2022

(54) VEHICLE SENSOR SYSTEM

(71) Applicant: GE Global Sourcing LLC, Norwalk, CT (US)

(72) Inventors: Bret Worden, Erie, PA (US); Jingjun Zhang, Lawrence Park, PA (US); David Petersen, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 451 days.

This patent is subject to a terminal disclaimer.

(21) Appl. No.: 16/409,002

(22) Filed: May 10, 2019

(65) Prior Publication Data
US 2019/0265131 A1 Aug. 29, 2019

Related U.S. Application Data

(63) Continuation of application No. 15/372,937, filed on Dec. 8, 2016, now Pat. No. 10,345,196, which is a
(Continued)

(51) Int. Cl.
| | | |
|---|---|---|
| *G01M 17/10* | (2006.01) | |
| *G07C 5/08* | (2006.01) | |
| *G01M 17/007* | (2006.01) | |
| *G07C 5/00* | (2006.01) | |
| *F16H 57/04* | (2010.01) | |

(52) U.S. Cl.
CPC .......... *G01M 17/10* (2013.01); *G01M 17/007* (2013.01); *G07C 5/006* (2013.01);
(Continued)

(58) Field of Classification Search
CPC ..... G01M 17/007; G01M 17/08; G01M 17/10
See application file for complete search history.

(56) References Cited

U.S. PATENT DOCUMENTS 5,959,365 A * 9/1999 Mantini .............. B60C 23/0408
307/10.1
6,286,992 B1 9/2001 Kyrtsos
(Continued)

FOREIGN PATENT DOCUMENTS

| CN | 101680319 A | 3/2010 |
|---|---|---|
| CN | 102322910 A | 1/2012 |
| CN | 102815266 A | 12/2012 |

OTHER PUBLICATIONS

Office Action dated Feb. 3, 2020 for corresponding Chinese patent application No. 201611167321.6 (12 pages).
(Continued)

*Primary Examiner* — Nathaniel J Kolb
(74) *Attorney, Agent, or Firm* — The Small Patent Law Group LLC; Christopher R. Carroll (57) ABSTRACT

A vehicle sensor system includes a fluid sensor configured to be disposed onboard a vehicle system and at least partially extend into a gearbox of a traction motor of the vehicle system. The fluid sensor is configured to output data representative of an amount of a lubricating fluid in the gearbox. The system also includes a positioning system configured to output data representative of movement or an absence of movement of the vehicle system, and one or more processors configured to determine the amount of the lubricating fluid in the gearbox based on the data that is output by the fluid sensor responsive to the data output by the positioning system indicating that the vehicle system has not moved or has moved by less than a designated distance for at least a designated, non-instantaneous period of time.

9 Claims, 7 Drawing Sheets

Related U.S. Application Data continuation-in-part of application No. 14/869,038, filed on Sep. 29, 2015, now Pat. No. 10,598,650, and a continuation-in-part of application No. 14/866,320, filed on Sep. 25, 2015, now Pat. No. 10,018,613, and a continuation-in-part of application No. 14/421,245, filed on Feb. 12, 2015, now Pat. No. 9,746,452.

(60) Provisional application No. 62/269,192, filed on Dec. 18, 2015.

(52) U.S. Cl.
 CPC ......... *G07C 5/0808* (2013.01); *G07C 5/0816* (2013.01); *F16H 57/0449* (2013.01)

(56) References Cited

U.S. PATENT DOCUMENTS

| | | |
|---|---|---|
| 6,487,478 B1 | 11/2002 | Azzaro et al. |
| 6,813,581 B1 * | 11/2004 | Snyder ............... G01K 7/42 |
| | | 246/169 A |
| 2002/0156557 A1 | 10/2002 | Gras |
| 2011/0282540 A1 | 11/2011 | Armitage et al. |
| 2015/0120515 A1 | 4/2015 | Stevenson et al. |

OTHER PUBLICATIONS

The English translation of the Office Action dated Feb. 3, 2020 for corresponding Chinese patent application No. 201611167321.6. (14 pages).

Communication Pursuant to Article 94(3) EPC, European Patent Office, Application No. 16 203 507.5-1012, dated Nov. 7, 2019, (6 pages).

Office Action dated Dec. 15, 2020 for corresponding European Patent Application No. 16 203 507.5.

Examination Report No. 1 dated Apr. 16, 2020 for corresponding Australian Application No. 2016273951.

\* cited by examiner

FIG. 7

VEHICLE SENSOR SYSTEM

CROSS-REFERENCE TO RELATED APPLICATIONS

This application is a continuation of U.S. patent application Ser. No. 15/372,937 (filed 8 Dec. 2016), which claims priority to U.S. Provisional Application No. 62/269,192 (filed 18 Dec. 2015), and which is a continuation-in-part of U.S. patent application Ser. No. 14/421,245 (filed 12 Feb. 2015, now U.S. Pat. No. 9,746,452), Ser. No. 14/866,320 (filed 25 Sep. 2015, now U.S. Pat. No. 10,018,613), and Ser. No. 14/869,038 (filed 29 Sep. 2015). The entire disclosures of all of these applications are incorporated herein by reference.

FIELD

The subject matter described herein relates to systems and methods that use information (e.g., data) provided by sensors onboard vehicles.

BACKGROUND

Various systems can include sensors for monitoring characteristics of the systems and/or surroundings of the systems. For example, vehicle systems, stationary power systems, etc., can include several sensors monitoring the same or different characteristics. These sensors can monitor vibrations, temperatures, states, or the like, of the systems in order to track operation of the systems, identify unsafe conditions, determine when maintenance or repair of the systems are needed, or to achieve other objectives. The data provided by the sensors may be used for one or more purposes to control operation and/or monitor health of the vehicles.

BRIEF DESCRIPTION

In one embodiment, a system includes a fluid sensor configured to be disposed onboard a vehicle system and at least partially extend into a gearbox of a traction motor of the vehicle system. The fluid sensor is configured to output data representative of an amount of a lubricating fluid in the gearbox. The system also includes a positioning system configured to output data representative of movement or an absence of movement of the vehicle system, and one or more processors configured to determine the amount of the lubricating fluid in the gearbox based on the data that is output by the fluid sensor responsive to the data output by the positioning system indicating that the vehicle system has not moved or has moved by less than a designated distance for at least a designated, non-instantaneous period of time.

In one embodiment, a system includes one or more processors configured to determine whether a movement measurement of a vehicle has changed by more than a designated, non-zero amount for at least a designated period of time. The one or more processors also are configured to one or more of obtain a fluid level measurement of a fluid onboard the vehicle or use the fluid level measurement of the fluid onboard the vehicle to determine how much fluid is onboard the vehicle responsive to determining that the vehicle has not moved by more than the designated, non-zero distance for at least the designated period of time.

In one embodiment, a system includes one or more processors configured to determine temperatures of plural axles onboard a vehicle at different times. The one or more processors also are configured to compare the temperatures of the axles with each other and identify at least one of the axles as damaged based on comparing the temperatures of the axles with each other.

In one embodiment, a method includes determining, with a controller, whether a movement measurement of a vehicle has changed by more than a designated, non-zero amount for at least a designated period of time, and, responsive to determining that the movement measurement has not changed by more than the designated, non-zero amount for at least the designated period of time, one or more of obtaining, from a sensor, a fluid level measurement of a fluid onboard the vehicle from the sensor or using the fluid level measurement of the fluid onboard the vehicle to determine how much fluid is onboard the vehicle.

In one embodiment, a method includes determining temperatures of plural components onboard a vehicle at different moving speeds of the vehicle using temperature sensors, comparing the temperatures of the components with each other using a controller, and identifying at least one of the components as damaged using the controller responsive to the temperatures of the at least one of the components increasing between two or more of the different moving speeds while one or more other components of the components do not increase or increase by a smaller difference relative to the at least one of the components between the two or more of the different moving speeds.

BRIEF DESCRIPTION OF THE DRAWINGS

The inventive subject matter described herein will be better understood from reading the following description of non-limiting embodiments, with reference to the attached drawings, wherein below.

DETAILED DESCRIPTION

Reference will be made below in detail to example embodiments of the inventive subject matter, examples of which are illustrated in the accompanying drawings. Wherever possible, the same reference numerals used throughout the drawings refer to the same or like parts. Although embodiments of the inventive subject matter are described with respect to vehicle systems such as trains, locomotives, and other rail vehicles, embodiments of the inventive subject matter are also applicable for use with vehicles generally, such as off-highway vehicles (e.g., vehicles that are not designed or permitted to travel on public roadways), agricultural vehicles, and/or transportation vehicles, each of which may include a vehicle consist. The vehicle systems may be automobiles or other over the road vehicles (e.g., trucks), or another type of vehicle. A vehicle system may be formed from two or more vehicles that communicate with each other to coordinate travel of the vehicle system, but that are not mechanically linked with each other. For example, a vehicle system may include two or more vehicles that wirelessly communicate with each other so that the different vehicles may change the respective speeds, tractive efforts, braking efforts, and the like, to cause the separate vehicles to travel together as a convoy or other group along the same route. Optionally, one or more embodiments of the systems and methods described herein may be used with other non-vehicular systems, such as stationary powered systems.

Figure 1:
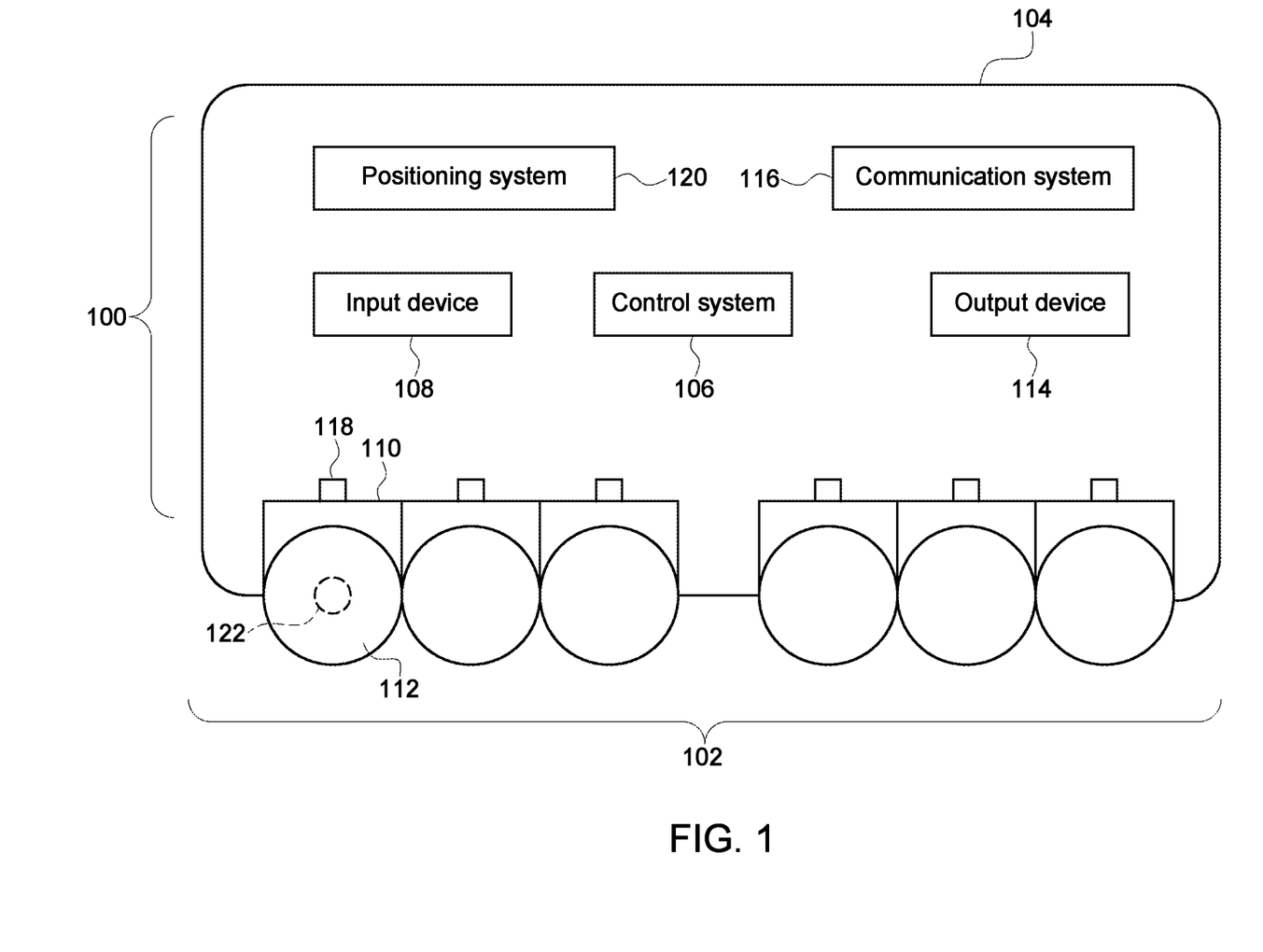
FIG. 1 illustrates a sensor system onboard a vehicle system according to one embodiment.

FIG. 1 illustrates a sensor system 100 onboard a vehicle system 102 according to one embodiment. The vehicle system 102 shown in FIG. 1 includes a single vehicle 104, but optionally may represent two or more vehicles that travel together along a route. The vehicles may be mechanically coupled with each other to travel together as a vehicle consist or may be mechanically decoupled but communicate with each other to coordinate movements of the vehicles and travel together as a convoy along the route. The vehicle can represent a propulsion-generating vehicle, such as a locomotive, automobile, over the road truck, marine vessel, or the like. Optionally, the vehicle can represent a non-propulsion-generating vehicle, such as a rail car, trailer, barge, or the like.

The vehicle includes a control system 106 that operates to control operations of the vehicle and/or vehicle system. The control system 106 can include or represent hardware circuitry that includes and/or is connected with one or more processors (e.g., microprocessors, field programmable gate arrays, integrated circuits, or other electronic logic-based devices). The control system 106 may receive signals from an input device 108, such as one or more throttles, pedals, buttons, switches, microphones, touchscreen, keyboards, or the like. An operator of the vehicle may actuate the input device to control operations, such as movement, of the vehicle via the control system. In response to receiving the input from the operator, the control system may communicate signals to one or more components of the vehicle or vehicle system to implement the input. For example, the vehicle may include traction motors housed within gear boxes 110 that the control system can control. The control system can communicate signals to the traction motors to control the torque generated by the traction motors, the speed at which the traction motors operate, etc., to control movement of axles 122 and wheels 112 of the vehicle or vehicle system. In another example, the control system can communicate signals to brakes or other components to control operations of the vehicle or vehicle system.

The vehicle includes an output device 114 that provides output to an operator of the vehicle or the vehicle system, to an off-board location, or to one or more other components of the vehicle or vehicle system. The output device 114 can represent a display, a touchscreen, a speaker, a wireless transceiver, etc. The output device 114 can receive signals from the control system that direct the output device 114 to present the output to the operator or other location. A communication system 116 represents hardware circuitry that communicates data signals with one or more locations or systems located off-board the vehicle. The communication system can include transceiving circuitry, such as one or more antennas, routers, modems, and the like, for communicating data signals.

The sensor system includes several sensors 118, 120. The sensors can represent a variety of devices that monitor characteristics of the vehicle system and/or the environment around the vehicle system. For example, the sensors may include temperature sensors (e.g., sensors that output data representative of temperatures of the vehicles and/or environment, such as hot box detectors, infrared cameras, etc.), vibration sensors (e.g., sensors that output data representative of movement in one or more directions, such as accelerometers), pressure sensors (e.g., sensors that output data representative of fluid pressure, such as air pressure in tires of the vehicles, pressures of oil or other lubricants in gear boxes and/or engines, etc.), fluid sensors (e.g., sensors that output data representative of an oil or other fluid level, or how much fluid, oil or other lubricant is in gear boxes, engines, etc.), positioning sensors (e.g., sensors that output data representative of geographic or other locations, such as a global positioning system receiver), speed sensors (e.g., sensors that output data representative of how rapidly a vehicle is moving, how rapidly a wheel and/or axle is rotating, etc.), acoustic sensors (e.g., sensors that output data representative of sounds, such as microphones), optic sensors (e.g., sensors that output data representative of images and/or videos, such as cameras, infrared detectors), electromagnetic sensors (e.g., sensors that obtain and/or output data using electromagnetic waves, such as radio frequency identification interrogators or tags), etc.

In the illustrated embodiment, one of the sensors is a positioning sensor 120, and is shown in FIG. 1 as a "Positioning System." For example, the positioning sensor or system can include a GPS receiver that outputs data representative of geographic locations, speeds, and/or headings of the vehicle 104. The sensors 118 may be operably connected with the gear boxes, traction motors, or the like, to monitor fluid levels. For example, the sensors 118 may be oil level sensors, such as one or more of the sensors described in one or more of U.S. patent application Ser. No. 14/421,245; 14/866,320; or 14/869,038. Alternatively, the sensors shown in FIG. 1 may be one or more other types of sensors, such as sensors measuring an amount of fuel in a fuel tank, an amount of coolant in a cooling system, etc. The sensors communicate data representative of the characteristics being monitored by the sensors (e.g., capacitance of the lubricant, an amount of the lubricant, vibrations, location of the vehicle, etc.) to the control system. The control system may use the data for one or more purposes as described herein. The components of the vehicle system and/or sensor system may be operably connected by one or more conductive pathways (e.g., cables, wires, buses, etc.) and/or wireless connections to allow for communication between the components.

Figure 2:
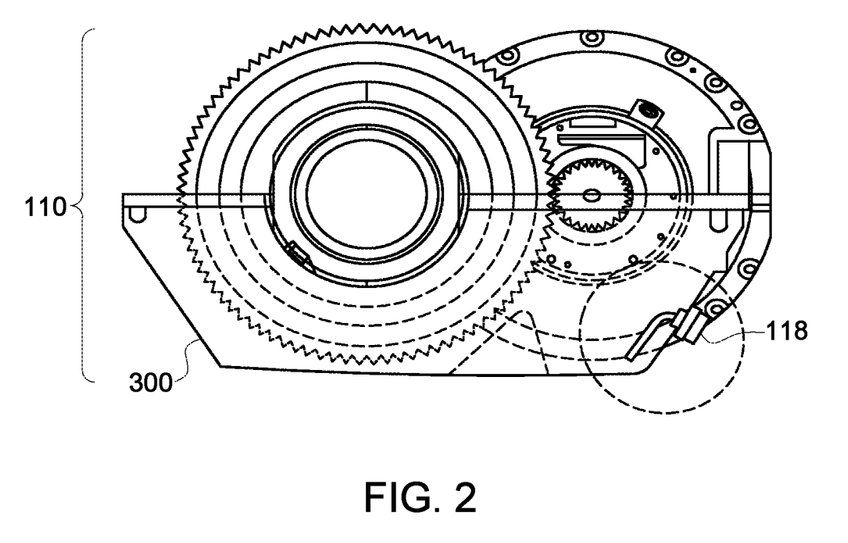
FIG. 2 illustrates one embodiment of a gear box in the vehicle shown in FIG. 1 with a fluid level sensor coupled thereto.

FIG. 2 illustrates one embodiment of a gear box 110 in the vehicle 104 shown in FIG. 1 with the oil level sensor 118 coupled thereto. The gear box 110 includes a housing 300 that holds a lubricant, such as oil, for lubricating gears and the like that interconnect a traction motor with an axle of the vehicle. The lubricant may be disposed within a lower portion of the housing, and the sensor 118 may extend into the housing and at least partially into the lubricant inside the housing. The sensor 118 can measure one or more characteristics of the lubricant, as described in one or more of U.S. patent application Ser. Nos. 14/421,245; 14/866,320; or 14/869,038.

During movement of the vehicle, however, the level sensor 118 may be subject to movement of the fluid being measured. For example, travel of the vehicle can cause the lubricant to move around within the housing of the gear box, cause fuel to move around in a fuel tank, and/or cause coolant to move around in a cooling system. This movement can cause the level sensor 118 to give inaccurate measurements of the fluid level in the housing. In order to increase the accuracy of the measurements provided by the level sensor 118, the sensor system may determine when the vehicle is stationary, such as when the vehicle is stationary for at least a designated period of time. This period of time may be sufficiently long to ensure that the fluid is in a steady state. For example, the period of time may be thirty seconds, five minutes, one hour, or another period of time. A steady state can occur when the fluid is no longer moving (e.g., not sloshing back and forth in the housing, not running down the sides of the housing, etc.). While the description herein focuses on measuring amounts of lubricant, optionally, one or more embodiments also may be used to measure amounts of other fluids, such as fuel, coolant, and the like.

In one embodiment, data provided by one or more other sensors in the sensor system (e.g., a sensor other than the level sensors 118) may be used to determine if the vehicle is stationary or if the lubricant within the housing is no longer moving (e.g., has reached steady state). For example, data generated, provided, or otherwise output by the positioning system or sensor can be used to determine which measurements of the level sensor are to be used to determine the amount of lubricant in the housing 300 and/or which measurements of the level sensor are not to be used to determine the amount of lubricant in the housing 300. The level sensor 118 may measure the amount of lubricant in the housing at a sampling rate and/or at non-periodic times. These measurements can be communicated to the control system and/or the output device. The measurements obtained at times when the lubricant is not at a steady state (as determined from data provided by the positioning system) may not be used to determine the amounts of lubricant in the housing, while the measurements obtained at times when the lubricant is at steady state (as determined from the data provided by the positioning system) may be used to determine the amounts of lubricant in the housing. For example, the control system may receive, but may disregard (e.g., not use), data that is output by the level sensor 118 that represents measured amounts of the lubricant during non-steady state time periods. The control system may receive and use (e.g., to determine how much lubricant is in the housing, to determine whether to generate an alarm to warn an operator of the vehicle system of a low amount of lubricant, etc.) the data output by the level sensor 118 that represents amounts of the lubricant measured during steady state time periods.

In one embodiment, the control system may determine when the vehicle has been stationary for at least a designated, non-zero period of time, such as one minute, three minutes, five minutes, or another time period. Only the measurements made by the level sensors after the vehicle has been stationary for at least this designated period of time may be used by the control system to determine how much lubricant is in the housings of the gear boxes. The other measurements may not be used. The control system may use the measurements by calculating or otherwise determining an amount of lubricant in the housing based on the data output by the level sensor.

The control system may determine when the vehicle has been stationary for at least the designated period of time by examining several measurements of the geographic location of the vehicle or the positioning system, as determined by the positioning system. Once the geographic location of the vehicle or positioning system has not changed or has not changed by more than a designated amount (e.g., has not changed by more than 1%, 3%, 5%, or another amount) in one or more, or all directions for at least the designated period of time, the control system can determine that the vehicle is stationary for a sufficiently long time to use the measurements provided by the level sensors. For example, the control system can examine the data output by the positioning system or sensor to determine if the geographic location of the vehicle system has changed by more than the designated, non-zero threshold amount (which can indicate a distance, such as five meters, ten meters, etc.).

The control system may examine the geographic locations, and not the speed, determined by the positioning system in order to avoid incorrectly identifying the vehicle as being stationary for at least the designated period of time. The control system may not examine the speeds because the speeds alone may not indicate whether the vehicle has been stationary for a sufficiently long period of time to ensure that the lubricant in the gear box has reached steady state. If the control system periodically examines the speeds output by the positioning system and/or the positioning system outputs the speeds on a periodic basis, then relying on the speed measurements from the positioning system (or another speed sensor) may not reflect how long the vehicle has been stationary. For example, if the vehicle stopped moving just before the positioning system measured the speed of the vehicle, the control system may determine that the vehicle is stationary. But, because the vehicle just stopped moving, the fluid lubricant in the housing 300 may still be moving and, as a result, a measurement of the fluid level in the housing may be inaccurate. The control system may instead require measurements of the same geographic location of the vehicle for at least the designated period of time before relying on the measurements from the level sensor as being accurate.

Additionally or alternatively, the control system may examine the speed or speeds determined by the positioning system in order to avoid incorrectly identifying the vehicle as being stationary for at least the designated period of time. The control system may examine the measured speed or speeds at one or more times and, if the speed or speeds do not vary by more than a designated amount (e.g., 1%, 3%, or 5%), then the control system can determine that the vehicle has been stationary for a sufficiently long period of time that the lubricant is no longer moving (e.g., has reached steady state). In one embodiment, the control system may sample the speed measurements at a sampling frequency that is at least as fast as a designated frequency (e.g., at least once per minute or at least once per second) to ensure that the vehicle has not moved between samples.

The measured geographic locations or speeds that are measured and examined by the control system may be referred to as movement measurements, as these measured characteristics can indicate whether the vehicle has moved during a preceding time period. While the description herein focuses on geographic locations as being the movement measurements, the measured speeds of the vehicle optionally may be examined.

Figure 3:
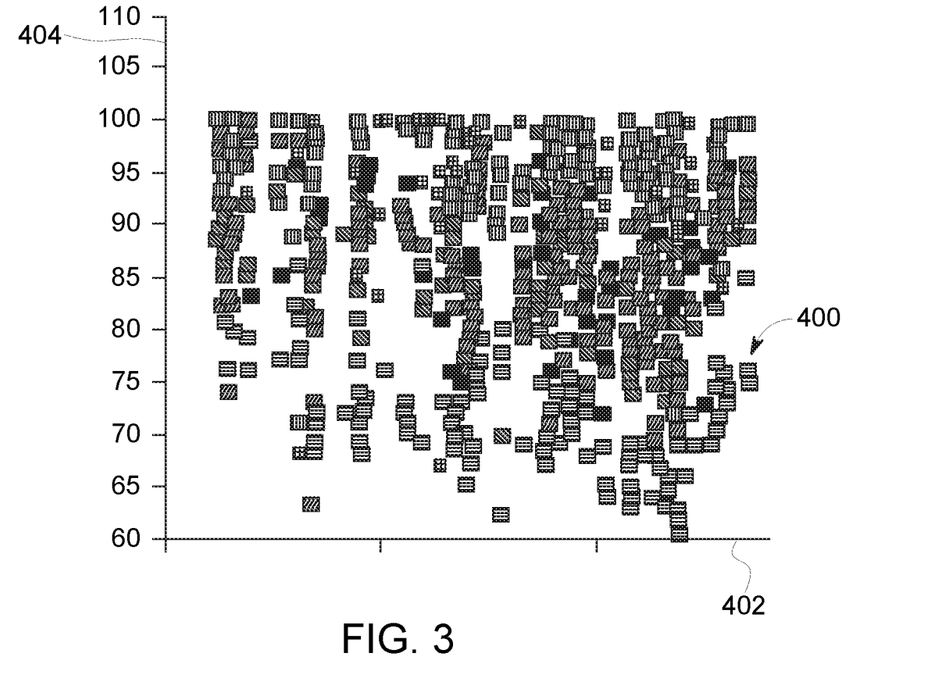
FIG. 3 illustrates fluid level measurements for multiple gear boxes in a vehicle as measured by fluid level sensors while in motion.
Figure 4:
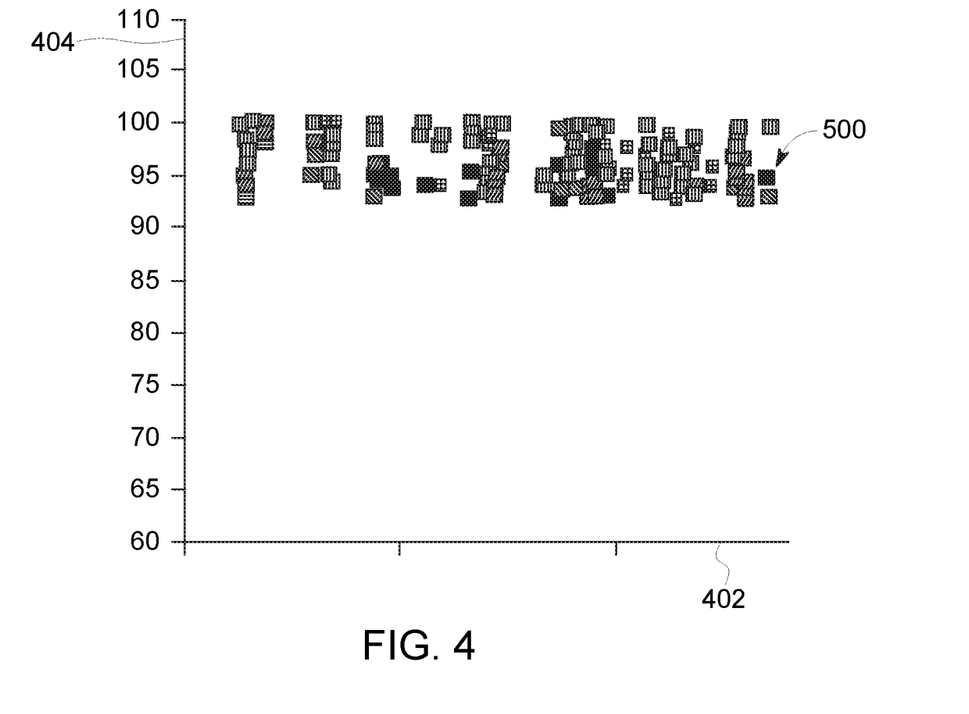
FIG. 4 illustrates fluid level measurements for the same gear boxes as FIG. 3 in a vehicle as measured by the fluid level sensors while stationary.

FIG. 3 illustrates oil level measurements 400 for multiple gear boxes 110 in a vehicle as measured by level sensors 118 while in motion. FIG. 4 illustrates oil level measurements 500 for the same gear boxes 110 in a vehicle as measured by level sensors 118 while stationary. The measurements 400, 500 are shown alongside a horizontal axis 402 representative of time and a vertical axis 404 representative of different amounts of lubricant in the gear boxes (e.g., in terms of percent of oil with 100% indicating that the gear box has a designated amount of oil, 50% indicating that the gear box has half of the designated amount of oil, etc.). The measurements 400 indicate the oil levels as measured without determining whether the vehicle is stationary for at least the designated period of time and the measurements 500 indicate the oil levels as measured when the vehicle has been stationary for at least the designated period of time. As shown by a comparison of the measurements 400, 500, the measurements 400 that are obtained without waiting for the vehicle to be stationary for at least the designated period of time are spread over a much larger range of amounts than the measurements 500, even though the same amount of oil is in the gear boxes. This indicates that ensuring that the vehicle is stationary for at least the designated period of time can provide more accurate measurements of the oil level, with much smaller variations or standard deviations of the measurements.

In one embodiment, one or more of the sensors 118 shown in FIG. 1 may include temperature sensors that measure the temperatures of one or more components of the vehicle. For example, the sensors 118 additionally or alternatively may represent temperature sensors that measure temperatures of the axles of the vehicle. The temperature of components or areas of the vehicle may provide data that is useful in determining or monitoring the health of the components or areas. The control system may compare the measured temperatures to designated temperatures or ranges of temperatures in order to determine if the components are damaged and/or in need of repair, inspection, and/or maintenance. The designated temperatures or ranges of temperatures may represent normal or healthy operations of the components.

But, the normal or healthy temperatures of various components can vary based on the operating conditions of the vehicle. For example, the normal or healthy temperatures of axles of the vehicle may increase or decrease with changing factors such as current and historical levels of ambient temperatures, rotational speed of the axles, powers applied by the motors to rotate the axles, torques generated by the motors, motor electric currents, vehicle direction, wind, precipitation, humidity, etc. A temperature that indicates a healthy axle that is measured with a first set of these factors may indicate a damaged axle when measured with a different set of these factors. As a result, simply comparing the temperature of a component to a designated threshold temperature or range of temperatures may not accurately determine whether the component is healthy or damaged.

In order to avoid incorrectly identifying a component as damaged or healthy based on the measured temperature due to changing operational conditions, the control system may compare the temperatures of the components onboard the same vehicle with each other, instead of simply comparing the temperatures to thresholds or ranges of temperatures. For example, the temperatures of axles of the vehicle may be evaluated by comparing the temperature measurements of the axles with each other in the same vehicle over an extended period of time. This extended period of time can be over hours, days, weeks, months, or years. Because the operational conditions for multiple axles on the same vehicle are likely to change by similar amounts at similar times, the temperatures of healthy or non-damaged axles on the same vehicle also are likely to change by similar amounts at similar times.

Figure 5:
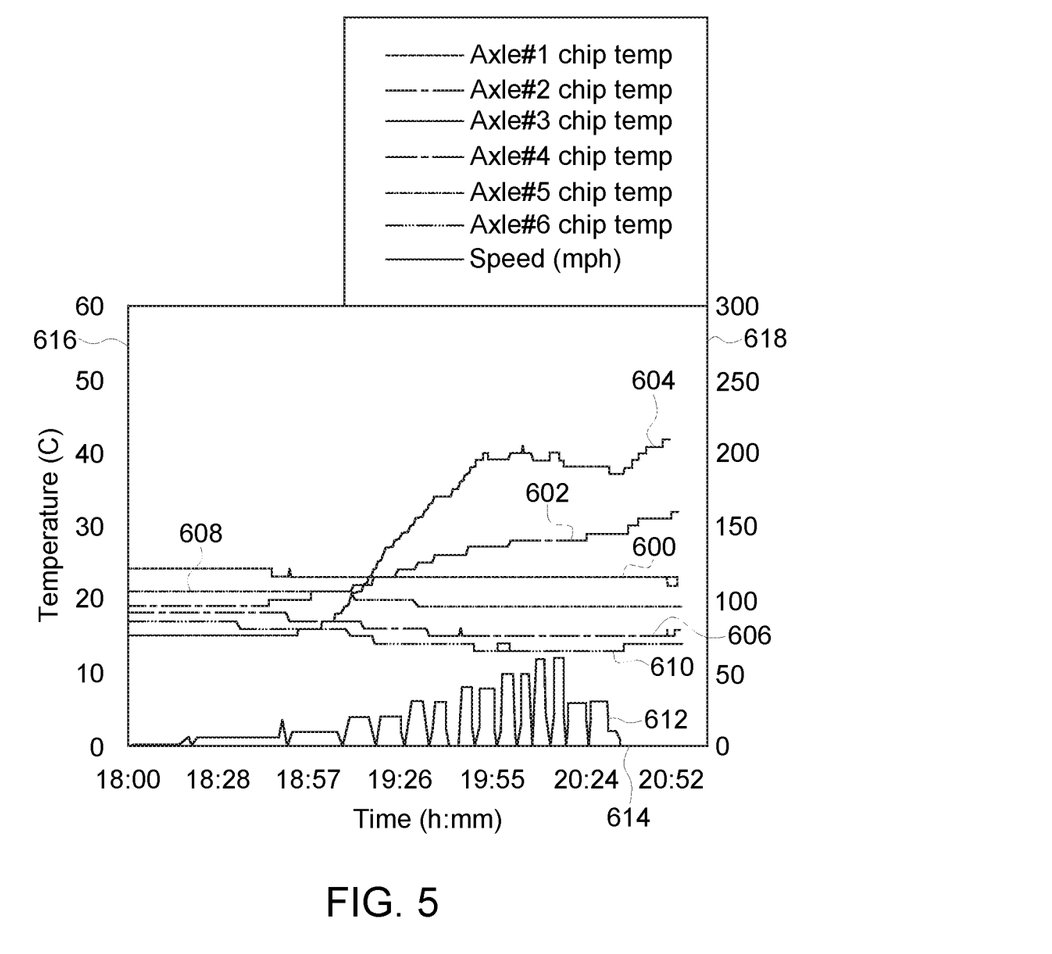
FIG. 5 illustrates measured temperatures of axles of the same vehicle according to one example.

FIG. 5 illustrates measured temperatures 600, 602, 604, 606, 608, 610 of axles 122 of the same vehicle according to one example. The temperatures 600, 602, 604, 606, 608, 610 represent the temperatures of different axles measured by the sensors 118 shown in FIG. 1. The temperatures 600, 602, 604, 606, 608, 610 are shown alongside a horizontal axis 614 representative of time. Moving speeds 612 of the vehicle that includes the axles are shown in addition to the temperatures 600, 602, 604, 606, 608, 610. A first horizontal axis 616 indicates different temperatures of the axles and a second horizontal axis 618 represents different speeds of the vehicle.

As shown in FIG. 5, the temperatures 600, 606, 608, 610 representative of the first, fourth, fifth, and sixth axle of the vehicle tend to remain relatively flat independent or regardless of vehicle speed 612. But, the temperatures 602, 604 of the second and third axle increase over time relative to the temperatures 600, 606, 608, 610 of the other axles. This indicates that whatever is causing the temperatures 602, 604 of the second and third axles to increase is not significantly affecting the temperatures 600, 606, 608, 610 of the other axles in the same vehicle. The control system may compare temperatures of the different axles with each other to determine if any of the axles have temperatures that deviate from the other axles (e.g., by at least a threshold amount, such as at least 10%, 15%, 20%, or the like). These deviating axles may be identified as requiring repair, inspection, and/or maintenance. In the example illustrated in FIG. 5, the control system may identify the second and third axles (associated with the temperatures 602, 604 as being damaged due to the temperatures 602, 604 increasing while the temperatures 600, 606, 608, 610 do not increase in the same way, amount, or manner.

The control system can examine the temperatures of different axles at different moving speeds of the vehicle system to determine which, if any, axles are damaged. Instead of merely comparing axle temperatures at any speed, in one embodiment, the control system may examine the axle temperatures at plural different speeds of the vehicle system to determine whether any of the axles are increasing (e.g., by at least the threshold amount) when other (or all other) axle temperatures are not increasing and/or whether any of the axles are decreasing (e.g., by at least the threshold amount) when other (or all other) axle temperatures are not decreasing at the different speeds. The axles having the measured temperatures that increase or do not decrease relative to one or more (or all) other axles in the same vehicle system at two or more different speeds of the vehicle system may be identified by the control system as being damaged.

Figure 6:
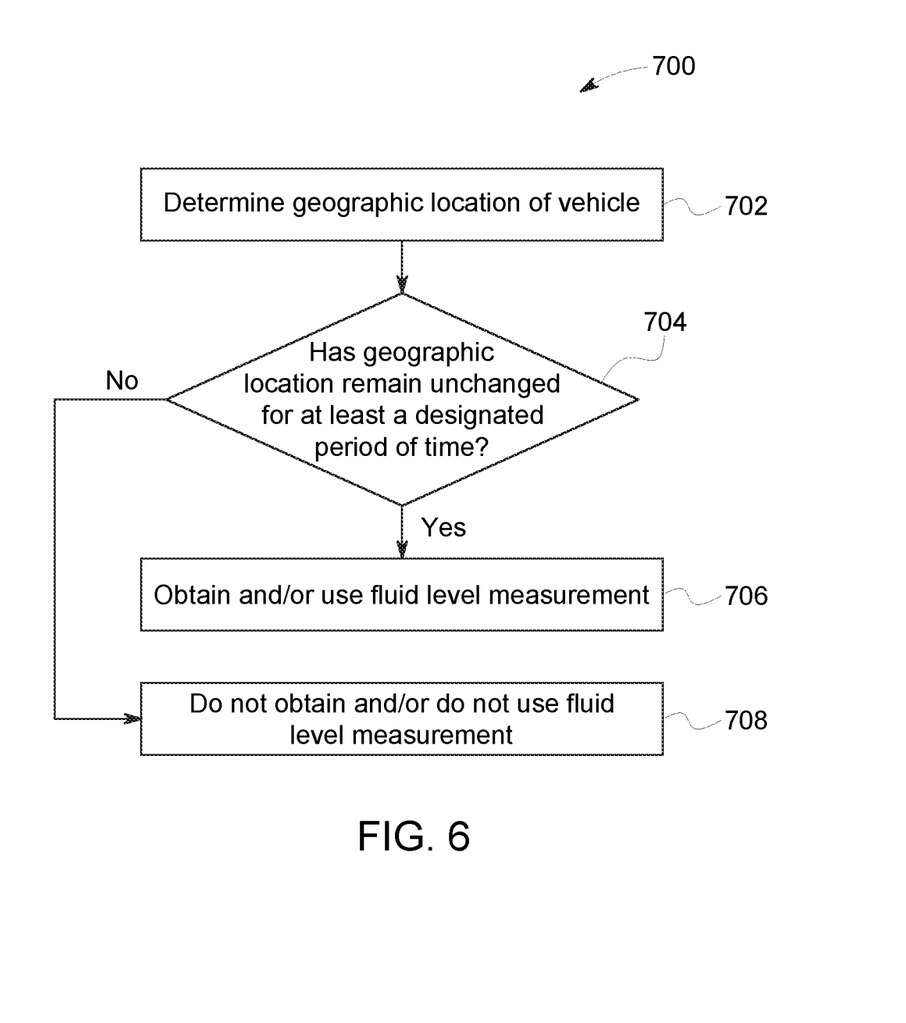
FIG. 6 illustrates a flowchart of one embodiment of a method for measuring fluid levels.

FIG. 6 illustrates a flowchart of one embodiment of a method 700 for measuring fluid level. The method 700 may be performed by one or more embodiments of the sensor system shown in FIG. 1. At 702, a movement measurement of a vehicle is determined. For example, a GPS receiver or other sensor that determines geographic locations may be used to determine a geographic location of the vehicle. Additionally or alternatively, a speed of the vehicle may be determined, such as from the GPS receiver. At 704, a determination is made as to whether the movement measurement of the vehicle has remained unchanged for at least a designated period of time. The control system may examine the movement measurements of the vehicle that were obtained at different times to determine whether the vehicle has remained stationary (e.g., the geographic location of the vehicle has not changed in one or more, or all, directions by more than a threshold amount, such as more than the noise in the signal received by the positioning system, by more than 1%, 2%, 3%, 5%, or the like) for a period of time that is long enough to ensure that the fluid has reached steady state and is not moving.

For example, a determination may be made as to whether the vehicle has been stationary long enough (e.g., at least one, two, three, five minutes, or another time period) to ensure that the lubricant, fuel, coolant, etc. is no longer sloshing around or moving within a tank or housing of the vehicle. If the geographic location has not changed by more than the threshold amount for at least the designated period of time, then the fluid may have reached steady state and the amount of fluid can be accurately measured. As a result, flow of the method 700 can proceed toward 706. Otherwise, the recent movement of the vehicle may cause the fluid to still be moving in the vehicle and an accurate measurement of the amount of fluid may not be able to be obtained. As a result, flow of the method 700 can proceed toward 708.

At 706, the fluid level may be obtained and/or used. In one embodiment, the sensor system may obtain a measurement of the fluid level responsive to determining that the vehicle has not moved by more than the threshold amount for at least the designated period of time. Alternatively, the sensor system may obtain repeated measurements of the fluid level and use the measurements obtained when the vehicle has not moved by more than the threshold amount for at least the designated period of time, while not using the other measurements, to determine how much fluid is onboard the vehicle.

One or more responsive actions may be performed using the fluid level that is measured. For example, the fluid level may be examined by the control system 106 and, if the control system 106 determines that the fluid level is low (e.g., less than a designated threshold), the control system 106 may communicate a control signal to a brake or propulsion system of the vehicle to slow or stop movement of the vehicle. Optionally, the control system 106 may communicate a signal to an off-board location (e.g., a repair or maintenance facility) to repair the vehicle (e.g., replenish the fluid).

At 708, the fluid level is not obtained and/or is not used. In one embodiment, the sensor system may refrain from obtaining a measurement of the fluid level unless or until determining that the vehicle has not moved by more than the threshold amount for at least the designated period of time. Alternatively, the sensor system may obtain repeated measurements of the fluid level, but may not use the measurements obtained when the vehicle has moved by more than the threshold amount within the designated period of time to determine how much fluid is onboard the vehicle.

Figure 7:
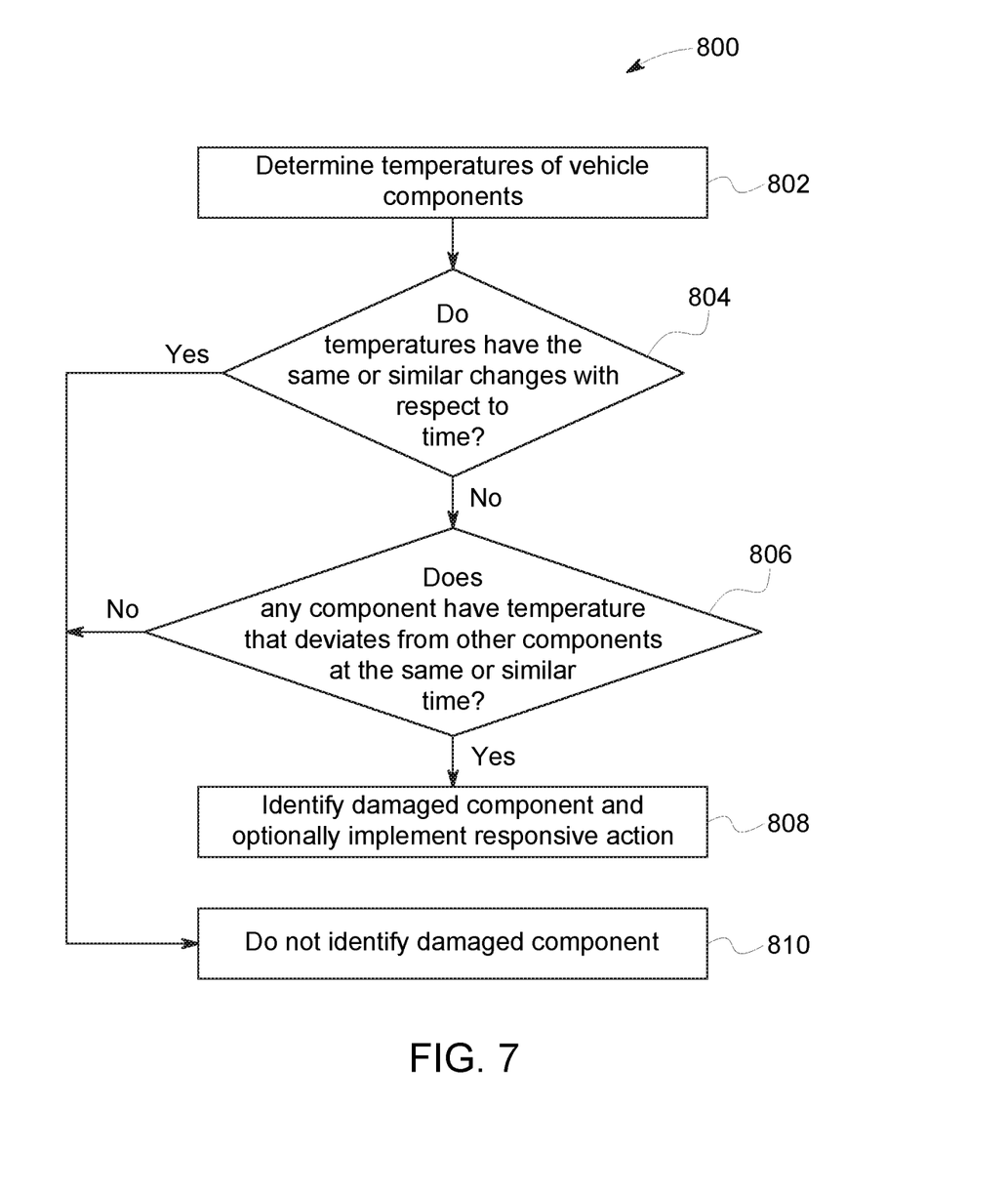
FIG. 7 illustrates a flowchart of one embodiment of a method for monitoring temperatures of components of a vehicle.

FIG. 7 illustrates a flowchart of one embodiment of a method 800 for monitoring temperatures of components of a vehicle. The method 800 may be performed by the sensor system shown in FIG. 1 to track temperatures of components such as axles of a vehicle, and/or to identify healthy or damaged axles based on the temperatures.

At 802, temperatures of the vehicle components are determined. The temperatures may be measured at several different times for the components onboard the same vehicle, such as several axles of a vehicle. The temperatures may be measured using one or more of the sensors 118, 120. At 804, a determination is made as to whether the temperatures have the same or similar changes with respect to time. For example, the changes in the temperatures over time may be examined by the control system 106 (also referred to as a controller) to determine if most or all of the components have temperatures that change by the same or similar amounts at the same time, or if the changes are not the same or similar for the components. If the temperatures for multiple or all components change by the same or similar amounts over time, then the changes in temperature can represent changing operational conditions instead of a damaged component. As a result, flow of the method 800 can proceed toward 810. But, if the temperatures for one or more of the components change by a different amount than the other components, then the change in temperature for the one or more component can represent a damaged component. As a result, flow of the method 800 can proceed toward 806.

At 806, a determination is made as to whether one or more of the components have a temperature that deviates from the other components at the same or similar time. For example, the control system 106 can compare the temperatures to determine whether one or more of the components have temperatures that increase or remain elevated when the temperatures of other components decrease or vary with respect to time. In such an occurrence, the deviation in temperatures among the components of the vehicle may indicate that one or more of the components is damaged. As a result, flow of the method 800 can proceed toward 808. On the other hand, if there is no such deviation between the temperatures of the components onboard the vehicle, then the temperatures may not indicate a damaged component. As a result, flow of the method 800 can proceed toward 810.

At 808, the component or components having the temperatures that deviate from the other component temperatures are identified as being damaged. For example, the control system 106 may identify the axles 122 having the deviating temperatures as being damaged. The deviating temperatures can indicate that the temperatures indicate damage to the components, and not changing operational conditions of the vehicle. Optionally, one or more responsive actions may be implemented, such as automatically scheduling repair, inspection, and/or replacement of the components. For example, the control system may communicate a signal to an off-board location to automatically schedule repair, inspection, and/or replacement of one or more of the components when the vehicle arrives at a repair facility.

At 810, the components are not identified as being damaged. For example, the control system 106 may identify the axles 122 not having the deviating temperatures as not being damaged. Because the temperatures of the components changed by the same or similar amounts and the temperatures did not significantly deviate from each other at the same time, the changes in the temperatures may be predominantly caused by changing operational conditions of the vehicle, as opposed to damage to the components.

One or more responsive actions may be implemented upon or responsive to determining that the component(s) have the deviating temperatures. For example, the control system 106 may communicate a control signal to a brake or propulsion system of the vehicle to slow or stop movement of the vehicle.

In one embodiment, a system includes a fluid sensor configured to be disposed onboard a vehicle system and at least partially extend into a gearbox of a traction motor of the vehicle system. The fluid sensor is configured to output data representative of an amount of a lubricating fluid in the gearbox. The system also includes a positioning system configured to output data representative of movement or an absence of movement of the vehicle system, and one or more processors configured to determine the amount of the lubricating fluid in the gearbox based on the data that is output by the fluid sensor responsive to the data output by the positioning system indicating that the vehicle system has not moved or has moved by less than a designated distance for at least a designated, non-instantaneous period of time.

Optionally, the positioning system is configured to output the data representative of a geographic location of the vehicle system and the one or more processors are configured to determine the amount of the lubricating fluid in the gearbox based on the geographic location that is output by the positioning system indicating that the vehicle system has not moved or has moved by less than the designated distance for at least the designated, non-instantaneous period of time.

Optionally, the fluid sensor is configured to output the data representative of the amount of the lubricating fluid in the gearbox to the one or more processors at a sampling frequency, and the one or more processors are configured to disregard the data representative of the amount of the lubricating fluid in the gearbox that is output during a time period that the vehicle system has moved by more than the designated distance.

Optionally, the system may also include temperature sensors configured to output data representative of temperatures of plural axles of the vehicle system. The one or more processors may be configured to compare the temperatures of the axles with each other and identify at least one of the axles as damaged based on comparing the temperatures of the axles with each other.

Optionally, the temperature sensors are configured to measure the temperatures of the axles at different moving speeds of the vehicle system and to output the data representative of the temperatures of the axles at the different moving speeds of the vehicle system to the one or more processors. The one or more processors are configured to examine the temperatures to identify the at least one of the axles as damaged responsive to the temperatures of the at least one of the axles increasing between at least two of the different moving speeds of the vehicle system while other axles of the axles do not increase between the at least two of the different moving speeds relative to the at least one of the axles.

Optionally, the temperature sensors are configured to measure the temperatures of the axles at different moving speeds of the vehicle system and to output the data representative of the temperatures of the axles at the different moving speeds of the vehicle system to the one or more processors. The one or more processors can be configured to examine the temperatures to identify the at least one of the axles as damaged responsive to the temperatures of the at least one of the axles not decreasing between at least two of the different moving speeds of the vehicle system while other axles of the axles decrease between the at least two of the different moving speeds relative to the at least one of the axles.

In one embodiment, a system includes one or more processors configured to determine whether a movement measurement of a vehicle has changed by more than a designated, non-zero amount for at least a designated period of time. The one or more processors also are configured to one or more of obtain a fluid level measurement of a fluid onboard the vehicle or use the fluid level measurement of the fluid onboard the vehicle to determine how much fluid is onboard the vehicle responsive to determining that the vehicle has not moved by more than the designated, non-zero distance for at least the designated period of time.

Optionally, the one or more processors are configured to repeatedly determine the movement measurement of the vehicle using a positioning system onboard the vehicle.

Optionally, the movement measurement is a geographic location of the vehicle system determined by a global positioning system receiver.

Optionally, the one or more processors are configured to obtain the fluid level measurement from a fluid level sensor that extends into the fluid onboard the vehicle.

Optionally, the one or more processors are configured to determine whether the vehicle has moved by more than the designated, non-zero distance for at least the designated period of time by determining whether the vehicle has remained stationary for a time period that is sufficiently long to ensure that the fluid has reached steady state onboard the vehicle.

In one embodiment, a system includes one or more processors configured to determine temperatures of plural axles onboard a vehicle at different times. The one or more processors also are configured to compare the temperatures of the axles with each other and identify at least one of the axles as damaged based on comparing the temperatures of the axles with each other.

Optionally, the one or more processors are configured to determine whether the at least one of the axles is associated with the temperatures that deviate from the temperatures of other axles of the axles onboard the vehicle.

Optionally, the one or more processors are configured to identify the at least one of the axles as damaged responsive to the temperatures of the at least one of the axles not decreasing when the temperatures of one or more of other axles decrease.

Optionally, the one or more processors are configured to automatically schedule one or more of repair, inspection, or replacement of the at least one of the axles responsive to identifying the at least one of the axles as damaged.

In one embodiment, a method includes determining, with a controller, whether a movement measurement of a vehicle has changed by more than a designated, non-zero amount for at least a designated period of time, and, responsive to determining that the movement measurement has not changed by more than the designated, non-zero amount for at least the designated period of time, one or more of obtaining, from a sensor, a fluid level measurement of a fluid onboard the vehicle from the sensor or using the fluid level measurement of the fluid onboard the vehicle to determine how much fluid is onboard the vehicle.

Optionally, the movement measurement is a geographic location of the vehicle provided by a positioning system onboard the vehicle.

Optionally, determining whether the movement measurement of the vehicle has changed by more than the designated, non-zero amount for at least the designated period of time includes determining whether the vehicle has remained stationary for a time period that is sufficiently long to ensure that the fluid has reached steady state onboard the vehicle.

In one embodiment, a method includes determining temperatures of plural components onboard a vehicle at different moving speeds of the vehicle using temperature sensors, comparing the temperatures of the components with each other using a controller, and identifying at least one of the components as damaged using the controller responsive to the temperatures of the at least one of the components increasing between two or more of the different moving speeds while one or more other components of the components do not increase or increase by a smaller difference relative to the at least one of the components between the two or more of the different moving speeds.

Optionally, the components are axles of the vehicle.

Optionally, the method also includes automatically scheduling one or more of repair, inspection, or replacement of the at least one of the components responsive to identifying the at least one of the components as damaged.

In one embodiment, a system includes one or more processors configured to reduce power obtained from a defective power-generating component of a power-generating system based on a temperature variation between the defective power-generating component and one or more additional power-generating components of the same power-generating system to reduce additional damage to the defective power-generating component until service can be performed on the defective power-generating component.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to those of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable any person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods for communicating data in a vehicle consist, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A system comprising:
   one or more sensors configured to measure temperatures of different axles of a vehicle; and
   one or more processors configured to obtain the temperatures that are measured and to compare the temperatures of the different axles for identifying a deteriorated condition of at least one of the axles;
   wherein the one or more sensors are configured to measure the temperatures of the axles at different speeds of the vehicle, wherein the one or more processors are configured to identify the deteriorated condition of at least one of the axles responsive to the temperature of a first axle of the axles changing relative to the temperatures of at least a second axle of the axles not changing between the different speeds of the vehicle.

2. The system of claim 1, wherein the one or more processors are configured to examine the temperatures to identify the deteriorated condition of the first axle responsive to the temperature of the first axle not decreasing between the different speeds of the vehicle while the temperature of at least the second axle decreases between the different speeds of the vehicle.

3. The system of claim 1, wherein the one or more processors are configured to examine the temperatures to identify the deteriorated condition of the first axle responsive to the temperature of the first axle increasing between the different speeds of the vehicle while the temperature of at least the second axle does not decrease between the different speeds of the vehicle.

4. The system of claim 1, wherein the vehicle is an automobile.

5. The system of claim 1, wherein the one or more processors are configured to automatically control operation of the at least one axle responsive to identifying the deteriorated condition.

6. A method comprising:
   measuring temperatures of different axles of a vehicle; and
   identifying a deteriorated condition of at least one of the axles by comparing the temperatures of the different axles;
   wherein the temperatures of the axles are measured at different speeds of the vehicle, wherein the deteriorated condition of at least one of the axles is identified responsive to the temperature of a first axle of the axles changing relative to the temperatures of at least a second axle of the axles not changing between the different speeds of the vehicle.

7. The method of claim 6, wherein the deteriorated condition of the first axle is identified responsive to the temperature of the first axle not decreasing between the different speeds of the vehicle while the temperature of at least the second axle decreases between the different speeds of the vehicle.

8. The method of claim 6, wherein the deteriorated condition of the first axle is identified responsive to the temperature of the first axle increasing between the different speeds of the vehicle while the temperature of at least the second axle does not decrease between the different speeds of the vehicle.

9. The method of claim 7, further comprising automatically controlling operation of the at least one axle responsive to identifying the deteriorated condition.

\* \* \* \* \*